(12) United States Patent
Osborn et al.

(10) Patent No.: US 7,428,968 B2
(45) Date of Patent: Sep. 30, 2008

(54) INJECTION MOLDED CASE FOR OPTICAL STORAGE DISCS

(75) Inventors: Warren R. Osborn, Provo, UT (US); Bryan P. Dunford, Pleasant Grove, UT (US)

(73) Assignee: Encore Holdings Limited, Naseau (BS)

( * ) Notice: Subject to any disclaimer, the term of this patent is extended or adjusted under 35 U.S.C. 154(b) by 242 days.

(21) Appl. No.: 11/268,205

(22) Filed: Nov. 7, 2005

(65) Prior Publication Data

US 2007/0102309 A1 May 10, 2007

(51) Int. Cl.
*B65D 85/57* (2006.01)
(52) U.S. Cl. .................... 206/308.1; 206/232
(58) Field of Classification Search ............. 206/307, 206/307.1, 308.1, 308.3, 309, 310, 387.1, 206/387.13, 472–474, 493, 232; 220/672, 220/675, 4.24, 4.25, 307.1, 669
See application file for complete search history.

(56) References Cited

U.S. PATENT DOCUMENTS

| | | | | |
|---|---|---|---|---|
| 5,531,322 A | * | 7/1996 | Iwaki et al. ............. | 206/308.3 |
| 6,164,446 A | * | 12/2000 | Law ........................ | 206/308.1 |
| D497,074 S | * | 10/2004 | Dardashti ................. | D6/632 |
| D497,508 S | * | 10/2004 | Dardashti ................. | D6/632 |
| 2003/0196916 A1 | * | 10/2003 | Jakobowicz ............. | 206/308.1 |
| 2004/0195123 A1 | * | 10/2004 | Bird et al. ................ | 206/308.1 |

* cited by examiner

*Primary Examiner*—Luan K Bui
(74) *Attorney, Agent, or Firm*—Robert D. Katz; Cooper & Dunham LLP

(57) ABSTRACT

A one-piece, injection molded intended for display by positioning it upright includes a spine, a front cover coupled to the spine via a first living hinge, and a back cover coupled to the spine via a second living hinge. When in a closed configuration, the case has generally semi-cylindrical sidewalls, including upper and lower sidewalls, a spine sidewall, and a closure sidewall, which intersect in generally quarter-spherical corners. The case also has a pair of spaced-apart feet positioned along the lower sidewall of said case, each of said feet being medially split into first and second halves, said first half being integral with the front cover and said second half being integral with the back cover. The case may incorporate a flexible, polymeric sleeve that wraps around the spine sidewall, is bonded to the front and back covers near the edges of the closure sidewall.

9 Claims, 8 Drawing Sheets

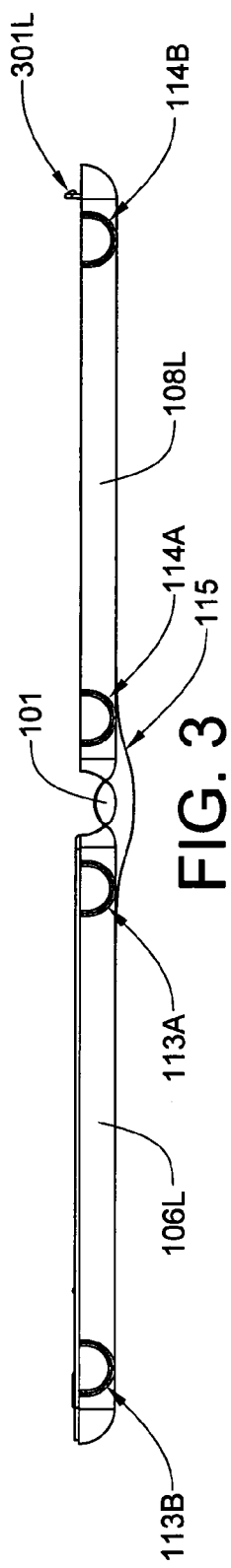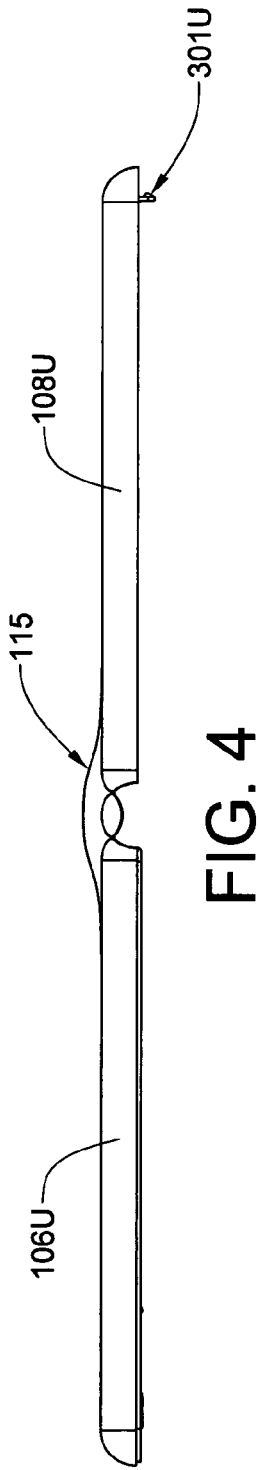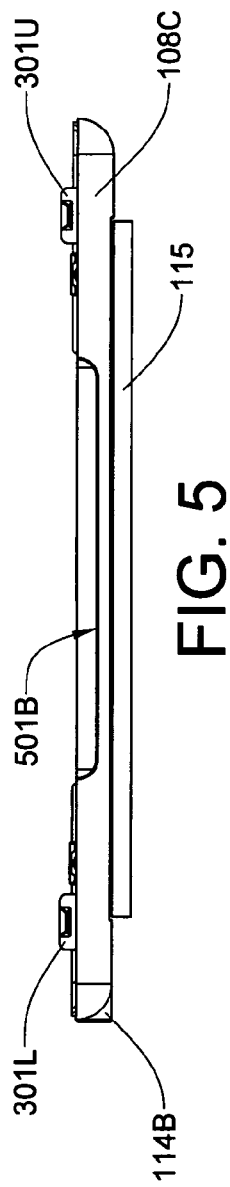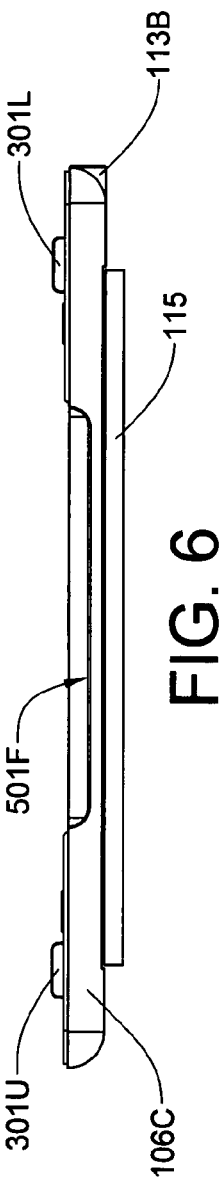

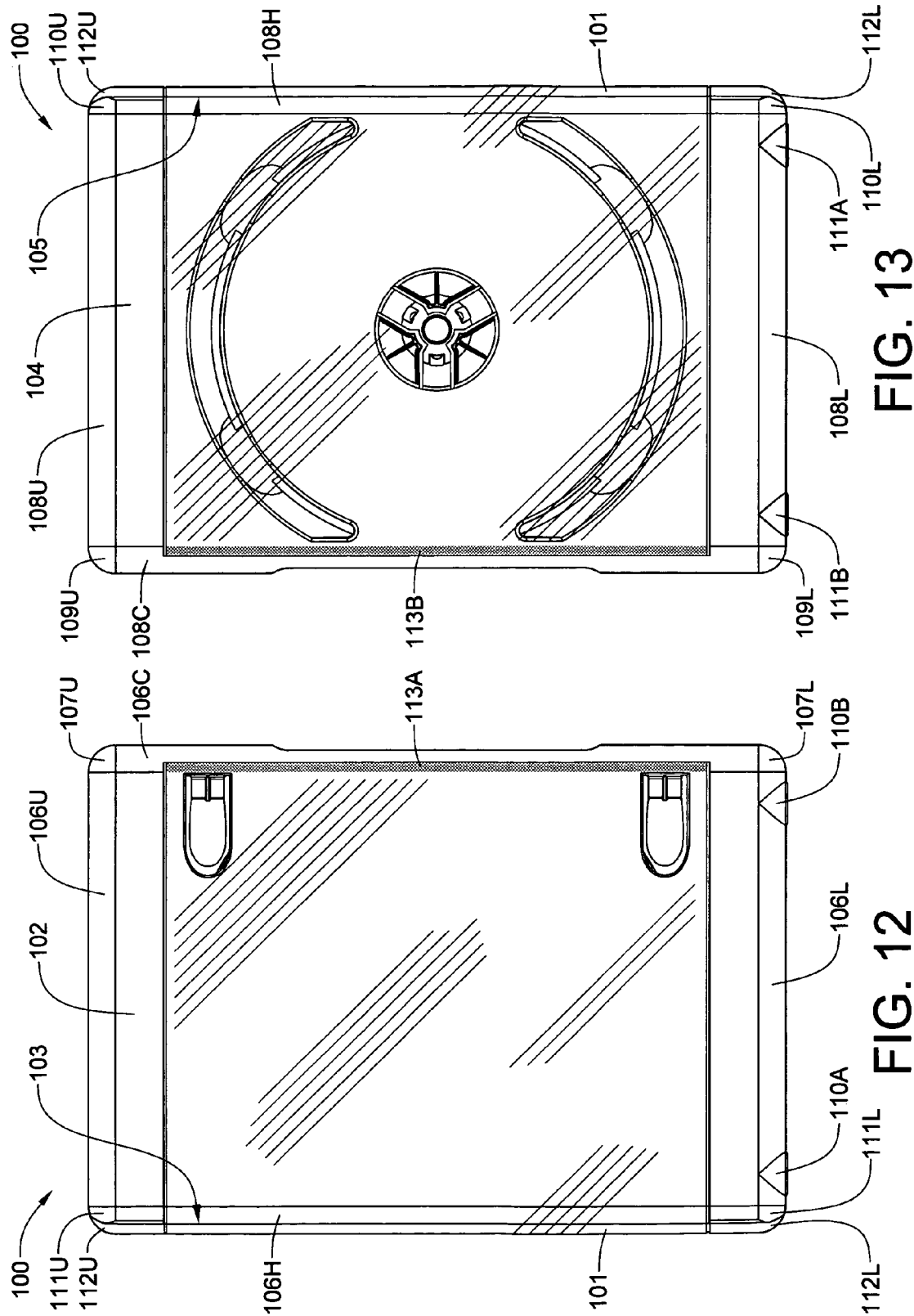

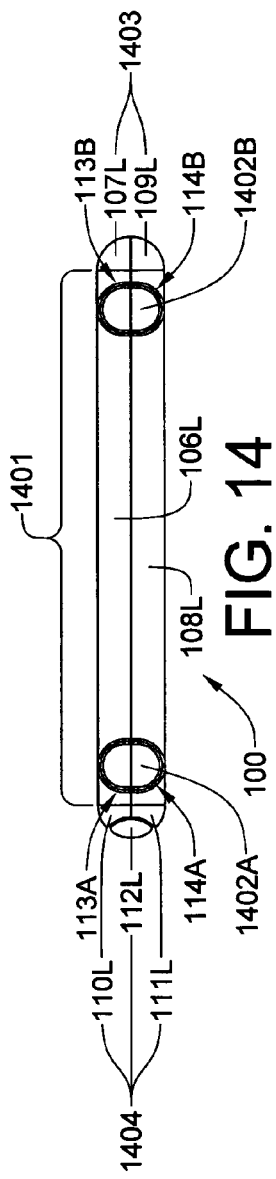
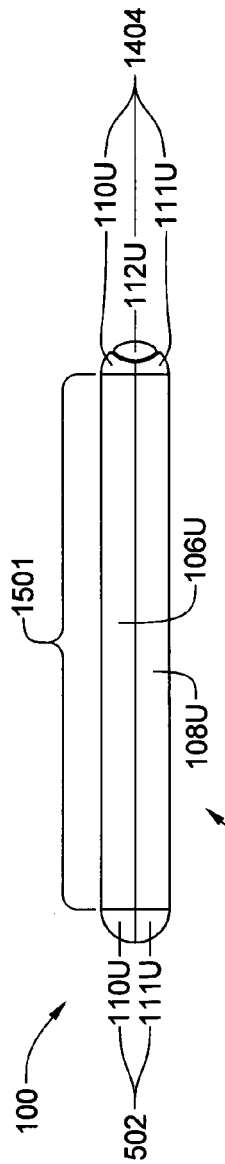
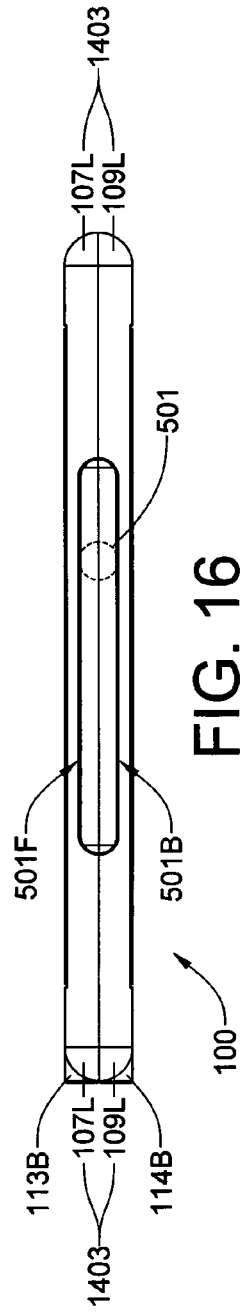
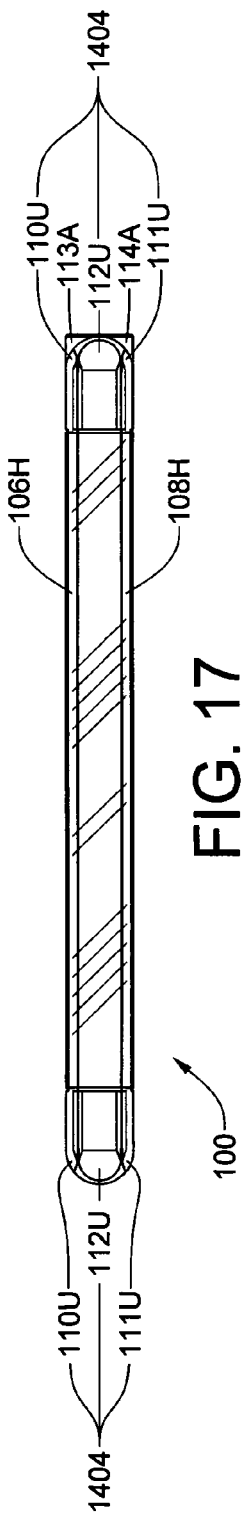
FIG. 14
FIG. 15
FIG. 16
FIG. 17

INJECTION MOLDED CASE FOR OPTICAL STORAGE DISCS

BACKGROUND OF THE INVENTION

1. Field of the Invention

This invention relates to cases for optical storage discs such as compact discs and digital video discs and, more particularly, to injection molded cases having a wrap-around flexible sleeve.

2. Description of the Prior Art

Cases for storing optical storage discs, such as compact discs (CDs) and digital video discs (DVDs) CDs and digital video discs (DVDs), when not being used, have been manufactured for about twenty years. The typical case is a square-cornered box having a center hub for receiving the central mounting aperture of the disk. There are significant differences between so-called "jewel cases" used to store CDs and the taller cases used to store DVDs. The first significant difference is that conventional jewel cases are typically injection molded from polystyrene plastic. As the use of this material precludes the use of a "live" hinge, the cases covers are formed in two pieces—a front cover and a back cover—that use snap-together hinges. A third piece, which is internal to the case, snaps into the back cover and holds the back information sheet in place. The second significant difference is that the mechanism used to hold CDs is generally a spring plastic assembly that requires that CDs be pried therefrom. DVD cases, on the other hand, are typically injection molded as a single piece from polyolefins, such as polyethylene and polypropylene, and rely on live hinges to interconnect a front cover, a spine and a back cover. In addition, as DVDs are considered to be more fragile than CDs, DVD case specifications require a disc retaining mechanism (usually called a hub) having a push-button release. Although some CD cases have been injection molded from polyolefins such as polyethylene and polypropylene and have used disc attachment mechanisms that do not require the CD to be pried therefrom, they constituted a tiny minority of CD cases in use.

U.S. Pat. No. D459,935 S discloses a typical injection-molded DVD case. It has a spine connected to both a front cover and a back cover via live hinges. Live hinges are ultra-thin and, hence, ultra-flexible strips of polyolefin material formed between spine and covers during the injection molding process. The case of this patent, like nearly all of those produced by the DVD packaging industry, is a shallow, medially split rectangular box with rounded edges and corners. Such boxes are not particularly good as self-standing items. In other words, they are unstable when one attempts to stand them on the lower sidewall. The instability is related to the relatively narrow band of flat surface thereon and typical slight misalignment of the front and back covers.

What is needed is a new injection molded DVD case that can be used as a display item by standing it upright. In addition, since the DVD case is intended as a display item, a new more aesthetically pleasing case design is also needed. The new design should be at least as structurally strong, if not stronger than the conventional genre of DVD cases and would, ideally, use less polyolefin material in its manufacture.

SUMMARY OF THE INVENTION

The present invention provides a new DVD case that answers the heretofore express need for a new one-piece, injection molded DVD case that can be used as a display item by standing it upright. As with conventional DVD cases, it also includes a spine, a front cover coupled to the spine via a first living hinge, and a back cover coupled to the spine via a second living hinge. However, for a preferred embodiment of the invention, the new DVD case, when in a closed configuration, has generally semi-cylindrical sidewalls, including upper and lower sidewalls, a spine sidewall, and a closure sidewall, which intersect in generally quarter-spherical corners. So that the front cover, the back cover and the spine may lie in a common plane when in an open configuration, it was found necessary to position the first live hinge at a first quarter position along the spine sidewall, and the second live hinge at a third quarter position along the spine sidewall. In other words, the front cover incorporates about one-fourth of the spine sidewall, the spine incorporates about one-half of the spine sidewall, and the back cover incorporates the remaining about one-fourth of the spine sidewall. This configuration has an added advantage in that, when the case is open, it occupies less table space than does a DVD case having the same thickness and a flat spine that is perpendicular to the front and back covers when the case is closed. In addition, the new DVD case has a pair of spaced-apart feet positioned along the lower sidewall of said case, each of said feet being medially split into first and second halves, said first half being integral with the front cover and said second half being integral with the back cover. In the event of slight misalignment caused by an imperfectly made mold or slight shrinkage, the feet can be easily trimmed so that the bottom of the first half of each foot is flush with its mating second half. Not only is the new DVD case unique and more aesthetically pleasing than current designs, it is also features enhanced structural rigidity and requires slightly less polyolefin material for its manufacture. The new DVD case may also incorporate a flexible, polymeric sleeve that wraps around the spine sidewall and is bonded to an edge of the closure sidewall on an outer surface of the front cover and to an edge of the closure sidewall on an outer surface of the back cover.

For aesthetic reasons, the flexible, polymeric sleeve may be displaced from the upper and lower semi-cylindrical sidewalls by at least an amount equal to the diameter of the case sidewalls.

BRIEF DESCRIPTION OF THE DRAWINGS

FIG. 3 is an elevational view of the top edge of the injection molded DVD case in a full open configuration;

FIG. 4 is an elevational view of the bottom edge of the injection molded DVD case in a full open configuration;

FIG. 5 is an elevational view of the open injection molded DVD case, as seen from the closure edge of the back cover;

FIG. 6 is an elevational view of the open injection molded DVD case, as seen from the closure edge of the front cover;

FIG. 12 is a plan view of the front cover of the injection molded DVD case in a closed configuration;

FIG. 13 is a plan view of the back cover of the injection molded DVD case in a closed configuration;

FIG. 14 is an elevational view of the bottom of the injection molded DVD case in a closed configuration;

FIG. 15 is an elevational view of the top of the injection molded DVD case in a closed configuration;

FIG. 16 is an elevational view of the closure edges of the injection molded DVD case in a closed configuration; and FIG. 17 is an elevational view of the spine of the injection molded DVD case in a closed configuration.

DETAILED DESCRIPTION OF THE INVENTION

The new, injection molded DVD case will now be described with reference to the attached drawing figures.

Figure 1:
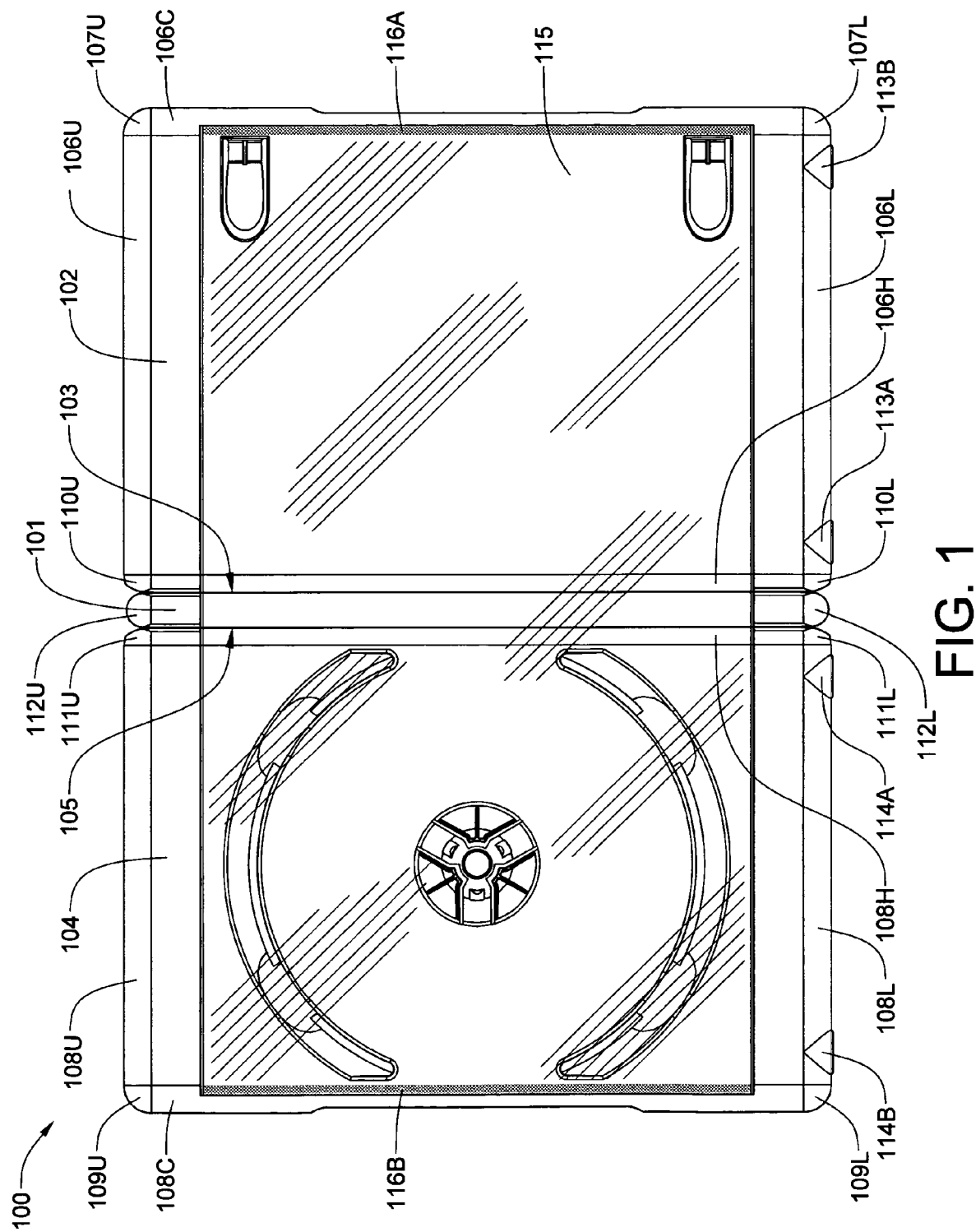
FIG. 1 is a plan view of the outer major surfaces of the injection molded DVD case in a full open configuration.

Referring now to FIG. 1, the DVD case 100 has a spine 101, a front cover 102 coupled to the spine 101 via a first living hinge 103, and a back cover 104 coupled to the spine 101 via a second living hinge 105. The front cover 102 has a quarter round (i.e., quartercylindrical) upper edge 106U, a quarter round lower edge 106L and a quarter round closure edge 106C. The upper edge 106U and the lower edge 106L each intersect the closure edge 106C to form a rounded, octospherical corner 107U and 107L, respectively. Likewise, the back cover 104 has a quarter round upper edge 108U, a quarter round lower edge 108L and a quarter round closure edge 108C. The upper edge 108U and the lower edge 108L each intersect the closure edge 108C to form a rounded, octospherical corner 109U and 109L, respectively. A pair of half feet 110A and 110B, which are unitary with the lower edge 107L of the front cover 102, align with a pair of half feet 111A and 111B, which are unitary with the lower edge 108L of the back cover 104, when the case 100 is in a closed configuration. The hinged edges 106H and 108H of the front cover 102 and back cover 104, respectively, are each rounded to have about an octocylindrical shape. The spine 101 is also rounded and has about a quartercylindrical shape. As will be seen in subsequent drawing figures, when the case 100 is in a closed configuration, the rounded hinged edges 106H and 108H and the spine 101 form a generally semicylindrical shape having quarterspherical corners. For a preferred embodiment of the invention, the DVD case 100 also incorporates a flexible, polymeric sleeve 115, that wraps around the spine 101 and is bonded adjacent the rounded closure edges 106C and 108C of the front and back covers, respectively. In conformity with industry practice, a printed paper insert (not shown) containing descriptive information relating to the enclosed DVD can be slipped beneath the flexible, polymeric sleeve 115. For such an application, the flexible, polymeric sleeve 115 would be transparent. Alternatively, information can be printed directly on the flexible, polymeric sleeve 115.

Figure 2:
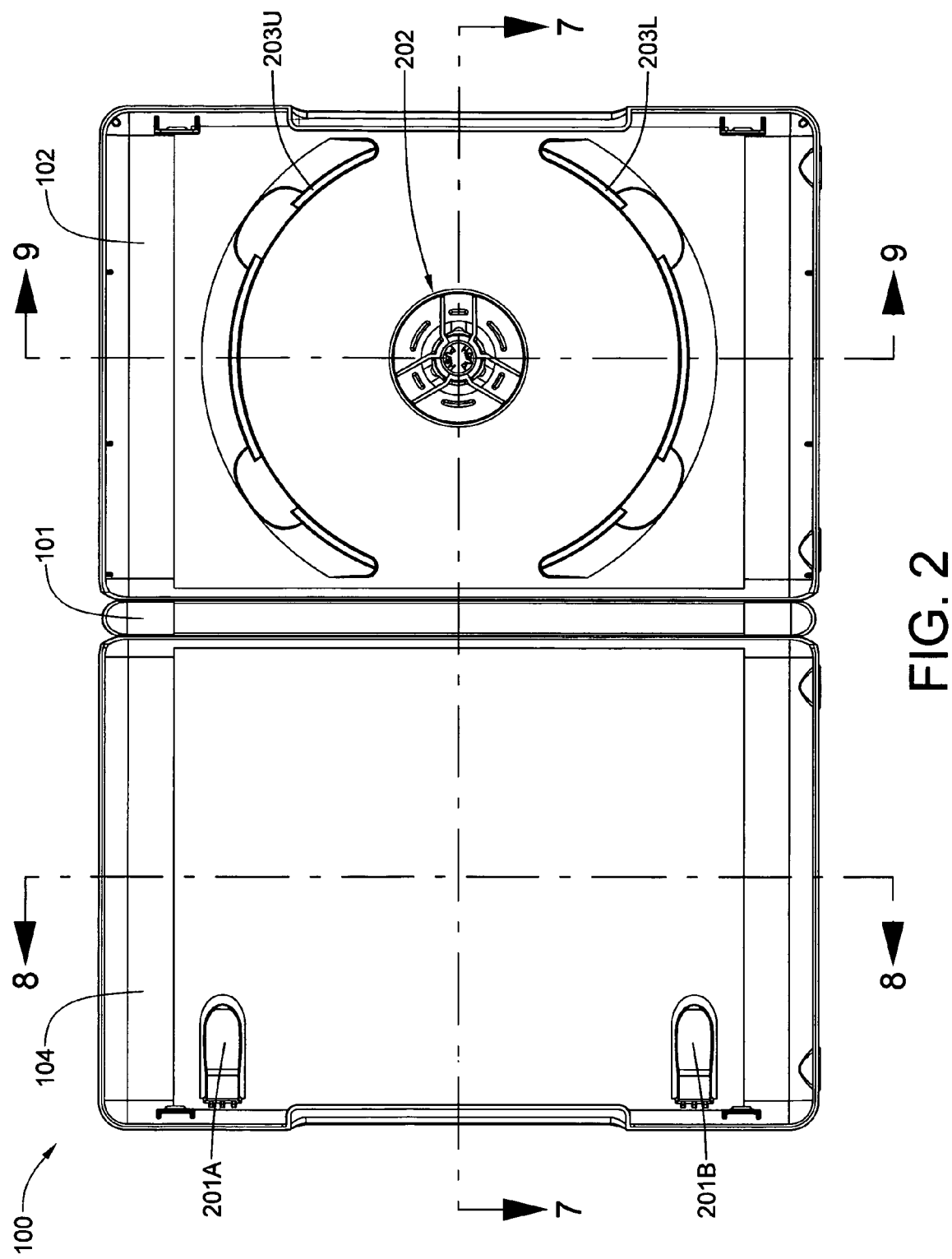
FIG. 2 is a plan view of the inner major surfaces of the injection molded DVD case in a full open configuration.

Referring now to FIG. 2, two clips 201A and 201B, which are integral with the front cover 102, are provided to hold information booklets. A disc attachment hub 202 and upper and lower disc support shelves 203U and 203L are provided inside the back cover 104.

Referring now to FIG. 3, the lower edges 106L and 108L of the front and back covers 102 and 104, respectively are visible, as is the flexible, polymeric sleeve 115 and the semicylindrical profile of the spine 101. Half feet 110A and 110B on the lower edge 106L of the front cover 102 and half feet 111A and 111B, which are on the lower edge 108L of the back cover 104, are also visible, as is a lower closure clasp 301L, which maintains the case locked when in a closed configuration.

Referring now to FIG. 4, the upper edges 106U and 108U of the front and back covers 102 and 104, respectively are visible in this view, as is the flexible, polymeric sleeve 115 and the upper closure clasp 301U.

Referring now to FIG. 5, the closure edge 108C of the back cover 104 is shown. Also visible in this view is the back cover half 501B of a longitudinally and medially split oblong recess 501, that provides opposed grips for opening the case 100 when closed. The flexible polymeric sleeve 115 is also visible in this view, as is half foot 111B.

Referring now to FIG. 6, the closure edge 106C of the front cover 102 is shown. Also visible in this view is the front cover half 501F of the longitudinally and medially split oblong recess 501, that provides opposed grips for opening the case 100 when closed. The flexible polymeric sleeve 115 is also visible in this view, as is half foot 110B.

Figure 7:
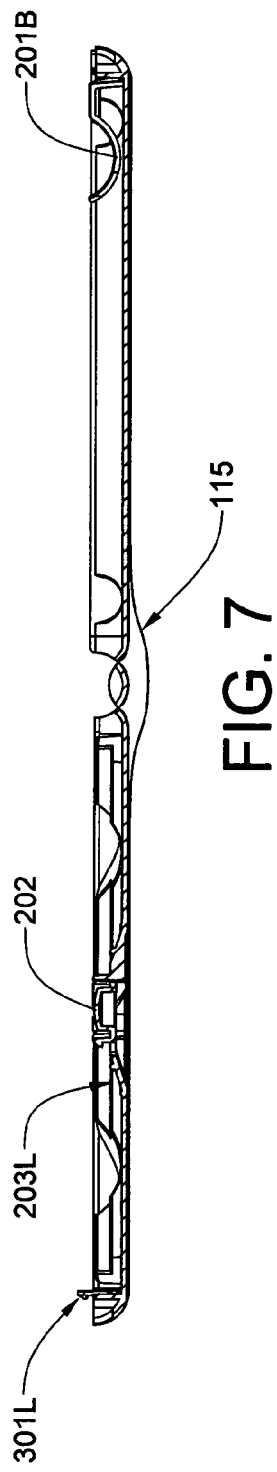
FIG. 7 is a cross-sectional view of the open injection molded DVD case, than through section line 7-7 of FIG. 2.

Referring now to FIG. 7, this cross-sectional view shows the clip 201B, the disc attachment hub 202, the lower disc support shelf 203L, and the lower closure clasp 301L. The flexible, polymeric sleeve 115 is also visible in this view.

Figure 8:
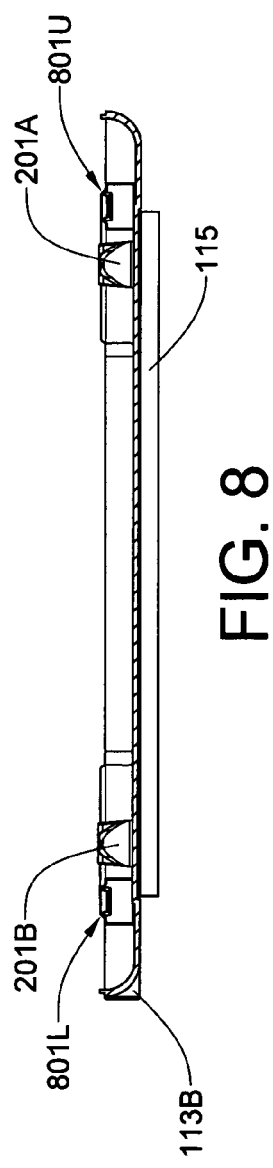
FIG. 8 is a cross-sectional view of the open injection molded DVD case, taken through section line 8-8 of FIG. 2.

Referring now to FIG. 8, this cross-sectional view shows the clips 201A and 201B, as well as upper and lower closure projections 801U and 801L, which engage upper and lower closure clasps 301U and 301L, respectively. The flexible, polymeric sleeve 115 is also visible in this view.

Figure 9:
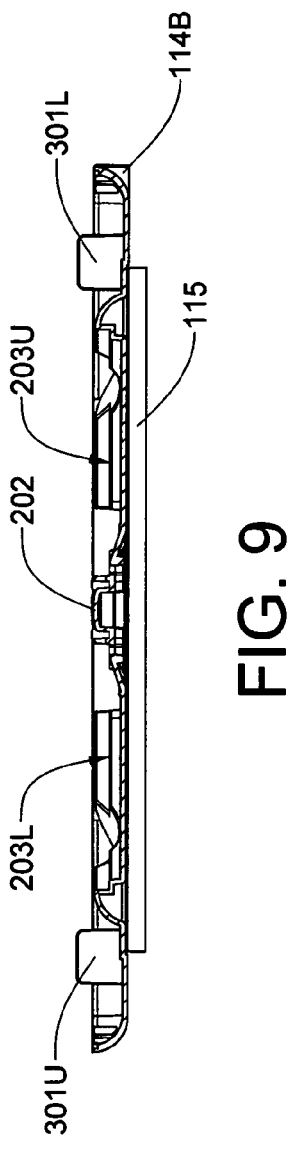
FIG. 9 is a cross-sectional view of the open injection molded DVD case, taken through section line 9-9 of FIG. 2.

Referring now to FIG. 9, this cross-section view shows the back side of upper and lower closure clasps 301U and 301L, the upper and lower disc support shelves 203U and 203L and the disc attachment hub 202.

Figure 10:
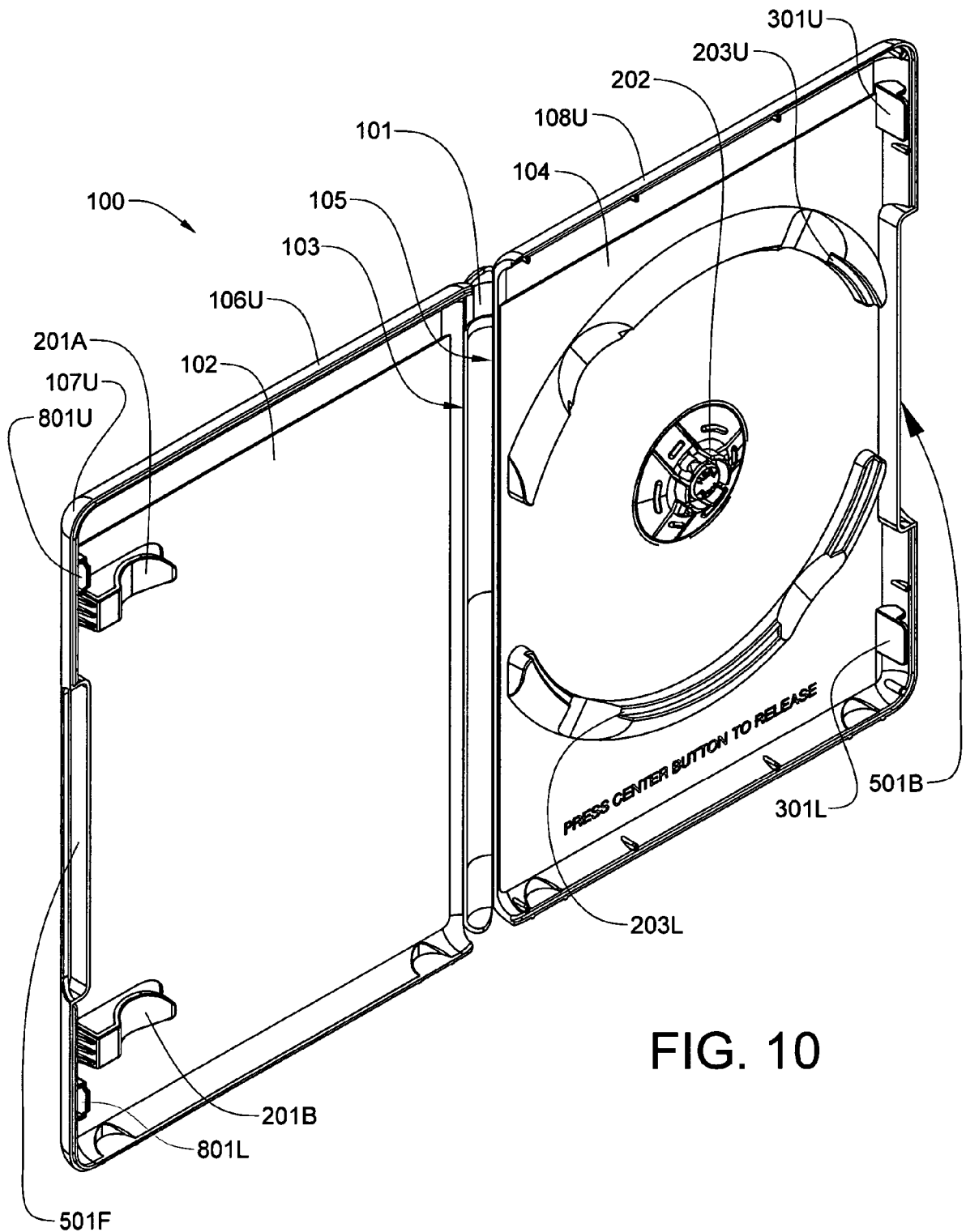
FIG. 10 is an isometric view of the open injection molded DVD case, showing the top edge of the front and back covers, the closure edge of the front cover, and the inner surfaces for the front and back covers.

Referring now to FIG. 10, this isometric view of primarily the interior of the DVD case 100 shows many of the heretofore described features from a different, and in many cases, clearer perspective.

Figure 11:
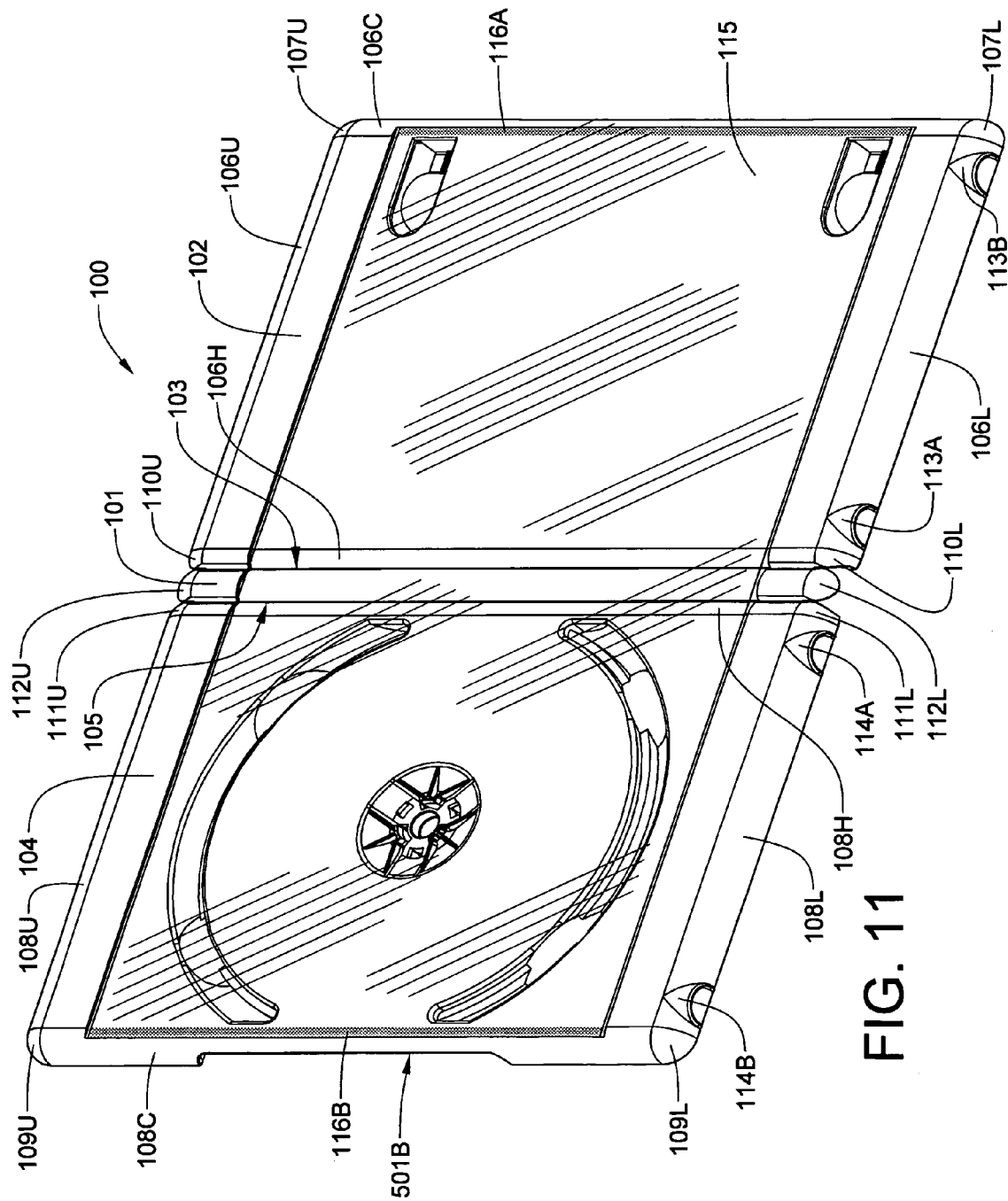
FIG. 11 is an isometric view of the open injection molded DVD case, showing the bottom edge of the front and back covers, the closure edge of the back cover, and the outer surfaces for the front and back covers.

Referring now to FIG. 11, this isometric view of primarily the exterior of the DVD case 100 shows many of the heretofore described features from a different, and in many cases, clearer perspective.

Referring now to FIG. 12, the front of the case 100 is shown in a closed configuration. The noteworthy feature of this drawing figure is the manner in which the spine 101 fits together with the front cover 102. It will be noted that the top and bottom portions 112U and 112L, respectively of the spine 101 curve into the upper and lower edges 110U and 110L of the front cover 102.

Referring now to FIG. 13, the back of the case 100 is shown in a closed configuration. The noteworthy feature of this drawing figure is the manner in which the spine 101 fits together with the back cover 104. It will be noted that the top and bottom portions 112U and 112L, respectively, of the spine 101 curve into the upper and lower edges 111U and 111L of the back cover 104.

Referring now to FIG. 14, the case 100 has been closed to show the bottom sidewall 1401. The bottom sidewall 1401 is a combination of the quarter-round lower edges 106L and 108L of the front and back covers 102 and 104, respectively. With the case 100 closed, the half feet 113A and 114A form a first unified oblong foot 1402A. Likewise, the half feet 113B and 114B form a second unified oblong foot 1402B.

Referring now to FIG. 15, the case 100 in a closed configuration shows the top sidewall 1501, which is a combination of the quarter-round upper edges 106U and 108U of the front and back covers 102 and 104, respectively.

Referring now to FIG. 16, the case 100 in a closed configuration shows the closure sidewall 1601, which is a combination of the quarter-round closure edges 106C and 108C of the front and back covers 102 and 104, respectively. It will be noted that the front cover half 501F and the back cover half 501B of the longitudinally and medially split oblong recess 501 are now adjacent. It can be clearly seen in this view how the oblong recess 501 provides opposed upper and lower grips for opening the case 100 when closed.

Referring now to FIG. 17, the case 100 in a closed configuration shows the spine sidewall 1701, which is a combination of the quarter-cylindrical spine 101 and the eighth-cylindrical rounded hinged edges 106H and 108H of the front and back covers 102 and 104, respectively.

Referring now collectively to FIG. 14 through 17, it will be noted that the bottom sidewall 1401 intersects with the closure sidewall 1601 and the spine sidewall 1701 to form first and second generally quarter-spherical corners 1702A and 1702B. Likewise, the top sidewall 1501 intersects with the closure sidewall 1601 and the spine sidewall 1701 to form second and third generally quarter-spherical corners 1702C and 1702D. So that the front cover 102, the back cover 104 and the spine 101 may lie in a common plane when in an open configuration, it was found necessary to position the first live hinge 103 at a first quarter position along the spine sidewall 1701, and the second live hinge 105 at a third quarter position along the spine sidewall 1701. In other words, the front cover 102 incorporates about one-fourth of the spine sidewall 1701, the spine 101 incorporates about one-half of the spine sidewall 1701, and the back cover 104 incorporates the remaining about one-fourth of the spine sidewall 1701. This configuration has an added advantage in that, when the case is open, it occupies less table space than does a DVD case having the same thickness and a flat spine that is perpendicular to the front and back covers when the case is closed.

Although only several embodiments of the invention has been shown and described, it will be obvious to those having ordinary skill in the art that changes and modifications may be made thereto without departing from the scope and the spirit of the invention as hereinafter claimed.

What is claimed is:

1. A one-piece, injection-molded case for optical storage discs, said case comprising:
    a spine;
    a front cover coupled to said spine via a first living hinge; and
    a back cover coupled to said spine via a second living hinge;
    wherein said case, when in a closed configuration, has generally semi-cylindrical sidewalls, including upper and lower sidewalls, a spine sidewall, and a closure sidewall, which intersect in generally quarter-spherical corners;
    wherein a flexible, polymeric sleeve wraps around the spine sidewall and is bonded to an edge of the closure sidewall on an outer surface of said front cover and to an edge of the closure sidewall on an outer surface of said back cover, said flexible, polymeric sleeve covering major portions of said front cover, said back cover, and said spine, and said flexible, polymeric sleeve is displaced from the upper and lower semi-cylindrical sidewalls by at least an amount equal to the diameter of the sidewalls;
    wherein said first live hinge is positioned at a first quarter of the spine sidewall, and said second live hinge is positioned at a third quarter of the spine sidewall such that the front cover, back cover and spine lie in a common plane when the case is in a open configuration and the front cover incorporates about one-fourth of the spine sidewall, the spine incorporates about one-half of the spine sidewall, and the back cover incorporates the about one-fourth of the spine sidewall; and
    wherein said spine is rounded having a generally quarter cylindrical shape, and said spine has curved upper and lower edges which fit into corresponding cutouts in the upper and lower sidewalls, respectively, when the case is in a closed configuration, a first half of each of said cutouts being incorporated in the front cover and a second half of each of said cutouts being incorporated in the back cover.

2. The case of claim 1, further comprising a pair of spaced-apart, feet positioned along the lower sidewall of said case, each of said feet being medially split into first and second halves, said first half being integral with the front cover and said second half being integral with the back cover.

3. A one-piece, injection-molded case for optical storage discs, said case comprising:
    a spine;
    a front cover coupled to said spine via a first living hinge, said front cover having quarter-round upper, lower and closure edges;
    a back cover coupled to said spine via a second living hinge, said back cover having quarter-round upper, lower and closure edges; and
    a flexible, transparent, polymeric sleeve that is bonded to at least an edge most distant from the first living hinge of an outer surface of said front cover and to at least an edge most distant from the second living hinge of an outer surface of said back cover, said flexible, transparent, polymeric sleeve covering major portions of said front cover, said back cover, and said spine, and said flexible, transparent, polymeric sleeve is displaced from the upper and lower semi-cylindrical sidewalls by at least an amount equal to the diameter of the sidewalls;
    wherein, when said case is in a closed configuration, said front cover mates with said back cover to form generally semi-cylindrical upper, lower, and closure sidewalls, said upper and lower sidewalls intersecting with said closure sidewall to form a first pair of spaced-apart quarter-spherical corners;
    wherein said spine has curved upper and lower edges which fit into corresponding cutouts in the upper and lower sidewalls, respectively, when the case is in a closed configuration, a first half of each of said cutouts being incorporated in the front cover and a second half of each of said cutouts being incorporated in the back cover; and
    wherein said first live hinge is positioned at a first quarter of the spine sidewall, and said second live hinge is positioned at a third quarter of the spine sidewall.

4. The case of claim 3, wherein when said case is in a closed configuration, said spine mates with said front and back covers to form a generally semi-cylindrical spine sidewall that intersects with said upper and lower closure sidewalls to form a second pair of spaced-apart quarter-spherical corners.

5. The case of claim 3, further comprising a pair of spaced-apart feet positioned along the lower sidewall of said case, each of said feet being medially split into first and second halves, said first half being integral with the front cover and said second halt being integral with the back cover.

6. The case of claim 3, wherein said front cover incorporates about one-fourth of the spine sidewall, said back cover incorporates about one-fourth of the spine sidewall, and said spine incorporates about one-half of the spine sidewall, having an outer contour that is about quarter cylindrical.

7. The case of claim 3, further comprising an oblong recess center on the closure sidewall of the closed case, said oblong recess being longitudinally and medially split such that a first half of the recess is incorporated in the front cover and a second half of the recess in incorporated in the back cover, said oblong recess providing opposed grips for opening the case.

8. A one-piece, injection-molded case for optical storage discs comprising:

a spine;

a front cover coupled to said spine via a first living hinge;

a back cover coupled to said spine via a second living hinge; and a flexible, transparent, polymeric sleeve that is bonded to an edge of an outer planar surface of said front cover that is most distant from the first living hinge and to an edge of an outer planar surface of said back cover that is most distant from the second living hinge, said flexible, transparent, polymeric sleeve covering major portions of said front cover, said back cover, and said spine, and said flexible, transparent, polymeric sleeve is displaced from the upper and lower semi-cylindrical sidewalls by at least an amount equal to the diameter of the sidewalls;

wherein said case, when in a closed configuration, has an upper, a lower, a closure, and a spine sidewall, at least three of which are generally semi-cylindrical in shape.

9. The case of claim 8, further comprising a pair at spaced-apart, feet positioned along the lower sidewall of said case, each of said feet being medially split into first and second halves, said first half being integral with the front cover and said second half being integral with the back cover.

* * * * *